(12) United States Patent
Surana

(10) Patent No.: US 10,509,717 B1
(45) Date of Patent: Dec. 17, 2019

(54) SYSTEM, METHOD, AND COMPUTER PROGRAM FOR AUTOMATICALLY TESTING SOFTWARE APPLICATIONS INCLUDING DYNAMIC WEB PAGES

(71) Applicant: Amdocs Development Limited, Limassol (CY)

(72) Inventor: Sagar Subhash Surana, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 205 days.

(21) Appl. No.: 15/286,450

(22) Filed: Oct. 5, 2016

(51) Int. Cl.
*G06F 11/36* (2006.01)
*G06F 3/0482* (2013.01)
*G06F 3/0484* (2013.01)

(52) U.S. Cl.
CPC ...... *G06F 11/3684* (2013.01); *G06F 11/3664* (2013.01); *G06F 3/0482* (2013.01); *G06F 3/0484* (2013.01)

(58) Field of Classification Search
CPC ............. G06F 11/3684; G06F 11/3664; G06F 3/0482; G06F 3/0484
(Continued)

(56) References Cited

U.S. PATENT DOCUMENTS 5,983,001 A * 11/1999 Boughner ........... G06F 9/45512
714/38.1
6,332,211 B1 * 12/2001 Pavela ................ G06F 11/3664
702/119
(Continued)

FOREIGN PATENT DOCUMENTS

| CN | 102508779 A | 6/2012 |
|---|---|---|
| CN | 104714884 A | 6/2015 |
| WO | 2008016939 A2 | 2/2008 |

OTHER PUBLICATIONS

Memon et al., "GUI Ripping : Reverse Engineering of Graphical user Interfaces for Testing," IEEE, Nov. 2003, pp. 1-10.
(Continued)

*Primary Examiner* — Lewis A Bullock, Jr.
*Assistant Examiner* — Theodore E Hebert
(74) *Attorney, Agent, or Firm* — Zilka-Kotab, P.C.

(57) ABSTRACT

A system, method, and computer program product are provided for automatically testing software applications including dynamic web pages. In operation, an automated testing system identifies at least one software application on which to perform automated testing. The automated testing system identifies at least one graphical user interface (GUI) associated with the at least one software application. Further, the automated testing system identifies at least one input object associated with the at least one graphical user interface. The automated testing system determines whether the at least one input object is present in an object repository including known input objects and corresponding testing data. If it is determined that the at least one input object is present in the object repository, the automated testing system automatically generates a test for the at least one input object utilizing corresponding test input data from the object repository. If it is determined that the at least one input object is not present in the object repository, the automated testing system displays a prompt for additional information utilizing at least one user interface and adds the at least one input object to the object repository.

12 Claims, 6 Drawing Sheets

(58) Field of Classification Search
USPC .......................................................... 717/124
See application file for complete search history.

(56) References Cited

U.S. PATENT DOCUMENTS

| | | | | |
|---|---|---|---|---|
| 7,716,322 | B2* | 5/2010 | Benedikt | G06F 17/30864 |
| | | | | 709/217 |
| 9,600,401 | B1* | 3/2017 | Haischt | G06F 11/3664 |
| 2005/0086643 | A1* | 4/2005 | Shane | G06F 11/36 |
| | | | | 717/124 |
| 2008/0244524 | A1* | 10/2008 | Kelso | G06F 11/3664 |
| | | | | 717/124 |
| 2012/0016862 | A1* | 1/2012 | Rajan | G06F 11/3684 |
| | | | | 707/710 |
| 2014/0366005 | A1* | 12/2014 | Kozhuharov | G06F 11/3696 |
| | | | | 717/125 |
| 2015/0026152 | A1* | 1/2015 | Singh | G06F 17/30864 |
| | | | | 707/710 |
| 2015/0339213 | A1* | 11/2015 | Lee | G06F 11/3664 |
| | | | | 717/125 |
| 2016/0147645 | A1* | 5/2016 | Kandpal | G06F 11/3672 |
| | | | | 717/124 |

OTHER PUBLICATIONS

Memon et al., "Hierarchical GUI test case generation using automated planning," IEEE Transactions on Software Engineering, vol. 27, No. 2, Feb. 2001, pp. 144-154.

Last et al., "Book on Artificial Intelligence Methods in Software Testing," Series in Machine Perception and Artificial Intelligence, vol. 56, 2004, pp. 1-220.

Halaschek-Wiener, C., "Hierarchical GUI Test Case Generation Using Automated Planning," University of Maryland, Department of Computer Science, class CMSC 838P Paper Presentation, Spring 2005, pp. 1-27.

* cited by examiner

SYSTEM, METHOD, AND COMPUTER PROGRAM FOR AUTOMATICALLY TESTING SOFTWARE APPLICATIONS INCLUDING DYNAMIC WEB PAGES

FIELD OF THE INVENTION

The present invention relates to software testing, and more particularly to automatically testing software applications including dynamic web pages.

BACKGROUND

Currently, most test automation tools and processes lack intelligence for automatic test generation. Generally, these test automation tools and processes rely on receiving specific instructions from users. Moreover, test automation development and test automation execution are currently two separate phases.

In the case of graphical user interfaces (GUIs) and web-based applications in a particular domain (e.g. the telecommunications domain, ecommerce domain, etc.), many common objects are present, where behavior does not change from one website/portal to another or from one implementation to another. Currently, every user has to develop test automation scripts and provide test data for each of these activities and for each implementation separately.

To date, test automation development has been one hundred percent manual and has been an expensive activity. There is thus a need for addressing these and/or other issues associated with the prior art.

SUMMARY

A system, method, and computer program product are provided for automatically testing software applications including dynamic web pages. In operation, an automated testing system identifies at least one software application on which to perform automated testing. The automated testing system identifies at least one graphical user interface (GUI) associated with the at least one software application. Further, the automated testing system identifies at least one input object associated with the at least one graphical user interface. The automated testing system determines whether the at least one input object is present in an object repository including known input objects and corresponding testing data. If it is determined that the at least one input object is present in the object repository, the automated testing system automatically generates a test for the at least one input object utilizing corresponding test input data from the object repository. If it is determined that the at least one input object is not present in the object repository, the automated testing system displays a prompt for additional information utilizing at least one user interface and adds the at least one input object to the object repository.

DETAILED DESCRIPTION

Figure 1:
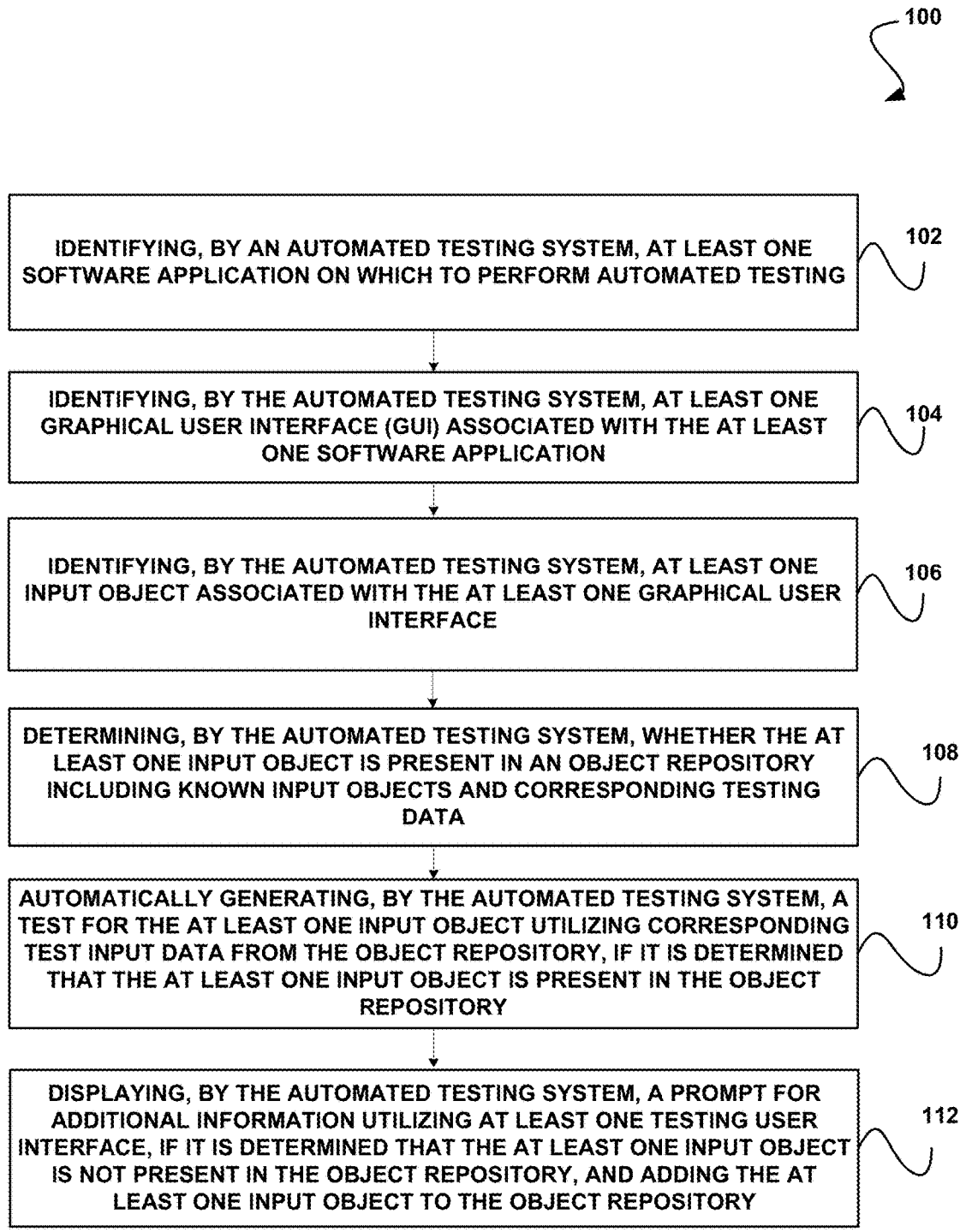
FIG. 1 illustrates a method for automatically testing software applications including dynamic web pages, in accordance with one embodiment.

FIG. 1 illustrates a method 100 for automatically testing software applications including dynamic web pages, in accordance with one embodiment.

As shown in FIG. 1, an automated testing system identifies at least one software application on which to perform automated testing. See operation 102. The software application may include any type of application. For example, in one embodiment, the software application may include a dynamic (i.e. non-static) web-based application. Moreover, the software application may be associated with various industries, such as the telecommunications industry, the ecommerce industry, and/or any other industry.

In one embodiment, the automated testing system may identify the software application for automated testing by receiving an indication that the software application should be tested. For example, identifying the software application on which to perform automated testing may include receiving a URL (Uniform Resource Locator) associated with the software application. In this case, the URL may be received as input from at least one testing user interface used to initiate a test. Of course, in various other embodiments, the automated testing system may automatically identify the software application and/or the software application may be selected for testing utilizing other techniques.

The automated testing system may include any system capable of executing tests for a software application, etc. In various embodiments, the automated testing system may include one or more processors, databases, repositories, software, computer code, logic, and/or subsystems, etc.

As shown further in FIG. 1, the automated testing system identifies at least one graphical user interface (GUI) associated with the at least one software application. See operation 104. In one embodiment, the automated testing system may utilize a web crawler to identify the graphical user interface. Further, a hyperlink associated with the software application may be used to identify a graphical user interface.

The graphical user interface may include various GUI objects, etc., and may be represented as a dynamic web page. The graphical user interface may also have links to various other web pages and/or GUIs, etc.

The automated testing system identifies at least one input object associated with the at least one graphical user interface. See operation 106. The input object may include any object capable of receiving an input, text, and/or commands, etc.

For example, in various embodiments, the input objects may include at least one text input field, at least one push button, at least one drop down menu, at least one check box, at least one GUI element, and/or any other type of testable GUI object.

Moreover, the input objects may be associated with any category of input. For example, the input object may be associated with a common object with standard behavior between two or more graphical user interfaces (i.e. a commonly used object). For example, in various embodiments, the input objects may be associated with a name input field, an address input field, a billing information input field, a phone number input field, an email address input field, a social security number input field, a payment information input field, a custom created input field, a shopping cart field, a product field, and/or any other field.

The automated testing system determines whether the at least one input object is present in an object repository including known input objects and corresponding testing data. See operation 108. For example, the automated testing system may access the object repository and compare a name or identifier of the identified object with a name or identifier of the known input objects stored in the object repository.

The testing data corresponding to the known input objects may include any type of information for testing a particular input object, such as parameters to be used in testing, testing criteria information, and/or any other data for testing the input object. It should be noted that if the identified object is not found by name in the object repository verbatim, the automated testing system may identify known objects in the repository that are similar in name and/or description.

If it is determined that the at least one input object is present in the object repository, the automated testing system automatically generates a test for the at least one input object utilizing corresponding test input data from the object repository. See operation 110. In one embodiment, automatically generating the test for the at least one input object utilizing corresponding test input data from the object repository may include providing a data set for testing the at least one input object. For example, the data set for testing the input object may be fetched from the object repository (or another database, etc.). In another embodiment, the data set for testing the input object may be automatically generated based on the test input data from the object repository.

In one embodiment, the method 100 may include the automated testing system automatically executing the test for the input object utilizing the corresponding test input data from the object repository. For example, once the identified object is found in the object repository, the automated testing system may test that object automatically and then use the web crawler to identify another input object on the GUI for automated identification and testing.

If it is determined that the at least one input object is not present in the object repository, the automated testing system displays a prompt for additional information utilizing at least one user interface and adds the at least one input object to the object repository. See operation 112. For example, a user may be prompted to provide testing parameters, etc., for the identified input object, the automated testing system may test the input object utilizing these parameters, and the identified input object and corresponding parameters, etc., provided by the user may be added to the object repository for future automated testing.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
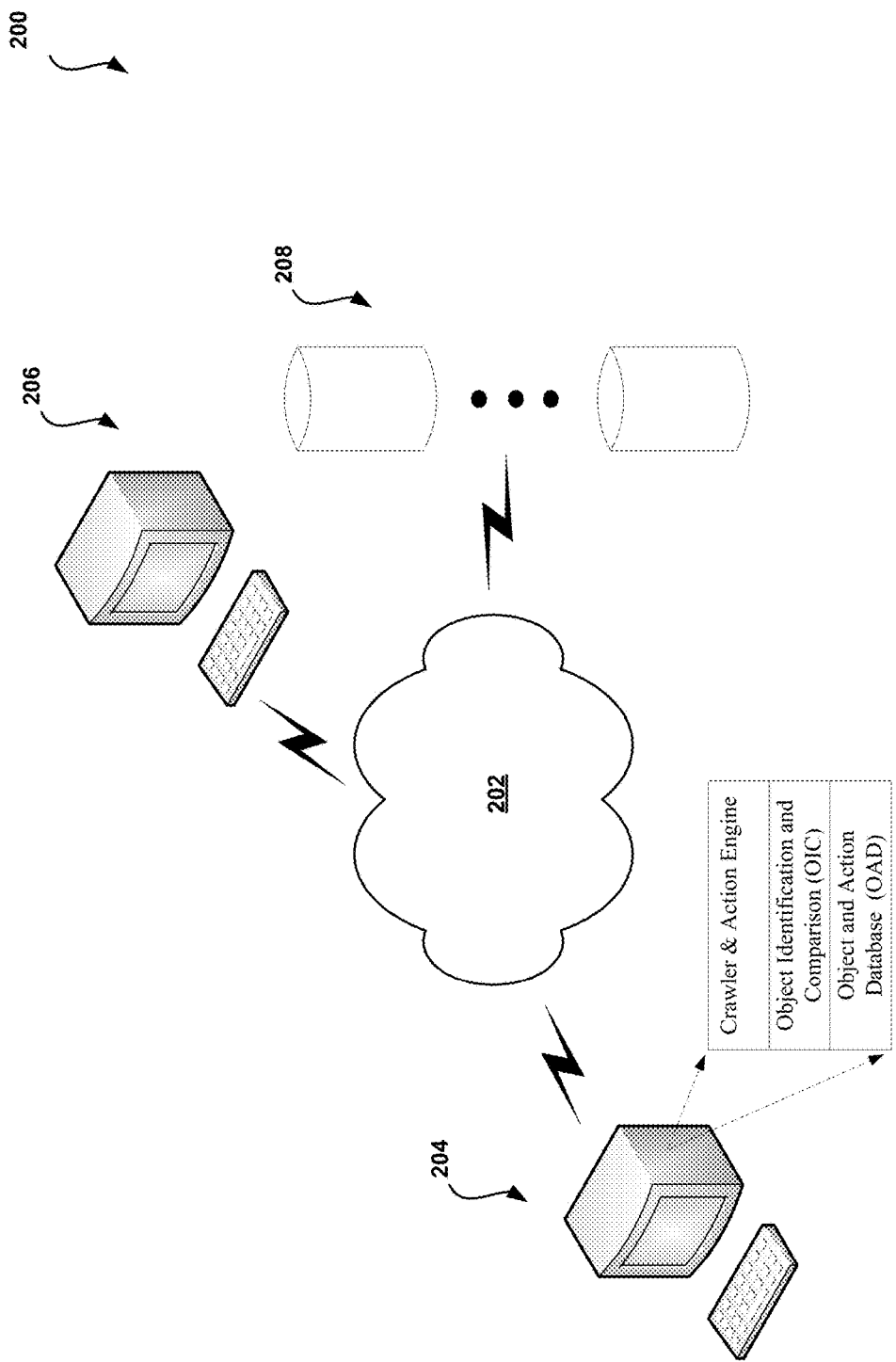
FIG. 2 shows a system for automatically testing software applications including dynamic web pages, in accordance with one embodiment.

FIG. 2 shows a system 200 for automatically testing software applications including dynamic web pages, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an automated testing system 204 including a variety of testing tools. The testing system 204 is in communication with a system under test 206, either directly, or over one or more networks 202. The testing system 204 is also in communication with one or more test repositories 208, which may include an input object repository also referred to herein as an object and action database.

Most test automation tools and processes lack intelligence. Generally, these test automation tools and processes rely on receiving instructions from users. Moreover, test automation development and test automation execution are generally two separate phases. In the case of graphical user interface and web-based applications in a particular domain (e.g. the telecommunications domain, ecommerce domain, etc.), many common objects are present, where behavior does not change much from one website/portal to another or from one implementation to another. Such common objects may include, for example, first name, last name, address fields, credit card details, phone numbers, email, social security numbers for registration or customer creation, selection of a product, adding to a cart, checking out, and payment, etc. Currently, each user has to develop test automation scripts for each of these activities for each implementation separately and provide test data. To date, test automation development has been 100% manual and has been an expensive activity. The testing system 204 addresses these problems.

The testing system 204 implements an intelligent crawler based test automation framework that improves the test automation process significantly for web-based applications (e.g. non-static pages). The testing system 204 implements a crawler engine, a module for self-identification of the objects, and inputs data in objects automatically if a matching object is found in an object database (e.g. the database 208, etc.). Every new object gets added to database and thus the database of objects grows for future use.

In operation, the crawler engine of the testing system 204 will crawl a web application (e.g. on the system under test 206, etc.) and identify the pages to be automated. The testing system 204 will then identify all the fields (e.g. the text fields, drop down menus, radio buttons, and various other objects, etc.) and automatically provide a set of fields. In one embodiment, this field set and corresponding data set may be stored in data tables. The data set may be a data set generated utilizing logic associated with testing system 204 and/or be fetched from any database or data files, or be user provided plain data. By utilizing the testing system 204, a tester/developer is not required to identify the fields and objects for creating test automation for the input objects.

The intelligent crawler based test automation framework of the testing system 204 for testing web-based systems will enable test automation testers and developers to develop test automation more quickly and efficiently, coupled with already available modular approaches for test automation in the industry.

Figure 3:
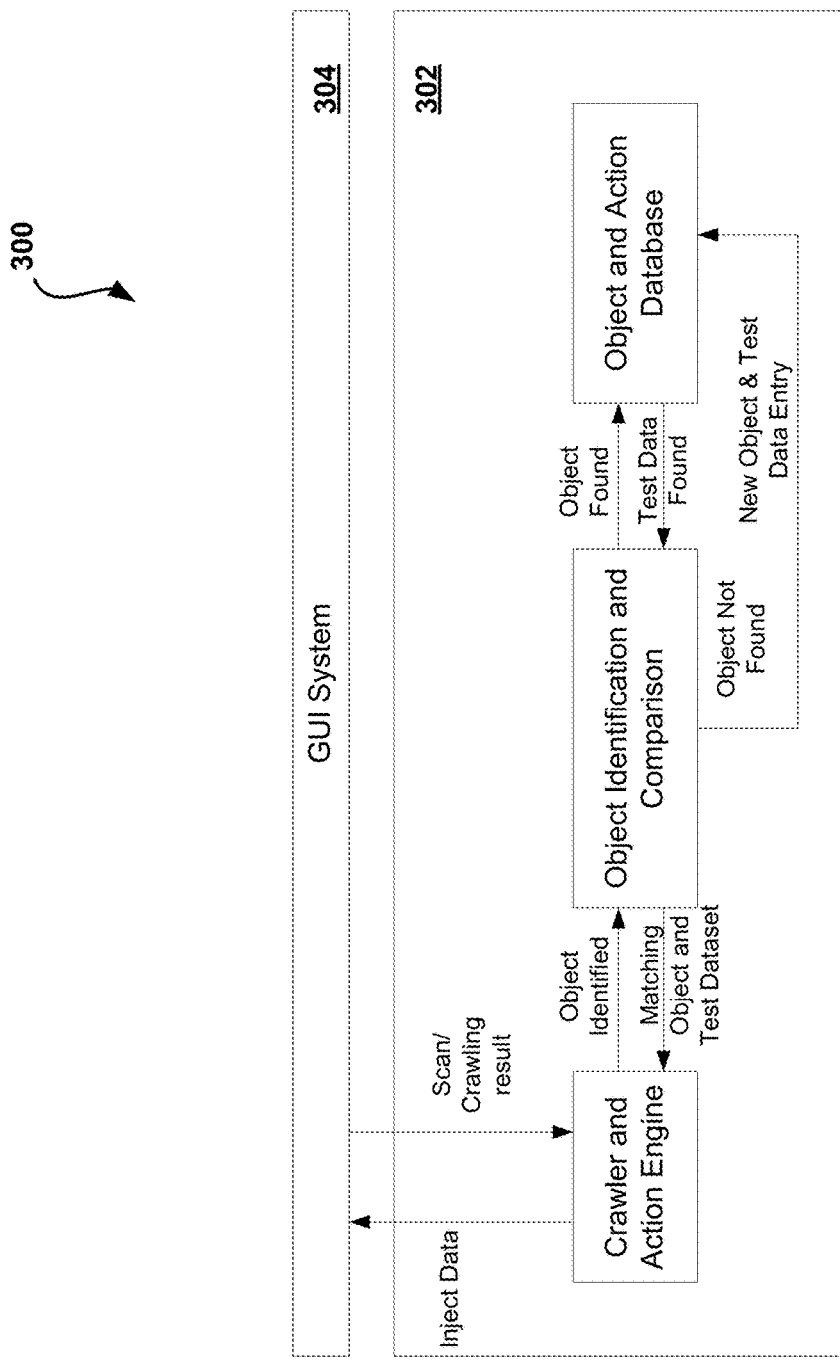
FIG. 3 shows a system flow diagram for automatically testing software applications including dynamic web pages, in accordance with one embodiment.

FIG. 3 shows a system flow diagram 300 for automatically testing software applications including dynamic web pages, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown, an automated testing system 302 is in communication with a GUI system 304 to be tested. The testing system 302 accesses, implements, and/or includes a web crawler and action engine, object identification and comparison (OIC) logic, and an object and action database (OAD), also referred to herein as an input object repository.

The testing system 302 may implement a user interface (UI) that presents a user the ability to input an application URL of the GUI system 304 and command the crawler and action engine to examine, based on various hyperlinks, and identify input on the page and also fetch the objects on each page that need input data. Once such objects are identified, the testing system 302 will check for existing objects in the object and action database using the object identification and comparison logic.

Once an object is found, the crawler and action engine instructs the object identification and comparison logic to identify the object and data based on the information in the object and action database that should be inputted (or other possible action to be taken) for this object, enabling the testing system 302 to progress from one field/page to another.

There are two possibilities when the logic is implemented: either the object and data are found in the database; or the object is not found the database.

For every new object that is found (i.e. the object is not found in the OAD by the OIC), the crawler and action engine of the testing system 302 records the new object and then may present the new object to a user to provide any needed action/information (e.g. to provide data, mark as optional and skip, etc.), and to provide data sets for the new object (e.g. this may be performed offline or online, etc.). The user may use the crawler multiple times to advance as the user resolves the dependency to new objects.

Each new object is saved in the object and action database with object information and category information (e.g. a user may choose from a set of categories, etc.). In one embodiment, the object and action database may be a cross project database, centralized, with an ability to be standalone for a particular project/implementation.

When an object is found using the object identification and comparison logic and corresponding data for the object is found in object and action database, in one embodiment, the object may be presented to the user, and the user may select the correct object or chose to add a new object. In one embodiment, if the user chooses the object, the testing system 302 may present the user with data sets and provide an option for the user to select/deselect values, add new values, and proceed. Once the user proceeds, the testing system 302 may receive this information as a dataset for the object. If the user choses to add the object as a new object, the testing system 302 will proceed as if a new object is being added.

In another embodiment, user interaction may not be involved and the testing system 302 may perform the dataset selection for an identified object and proceed with testing, without user interaction.

The testing system 302 may also record flows with various combinations of not inputting a particular data (negative flows), enabling testing of various combinations and validations with ease.

Object identification may be implemented using logic for scanning a webpage (e.g. a GUI, etc.) and for identifying various objects. In various embodiments, the comparison of the object may be based on the object name (e.g. a multilingual comparison may be used to compare the meaning of the object name with standard English names in the repository, etc.) and/or object type (e.g. a text box, drop down, check box, etc.).

If an exact match is not found in the database, the testing system 302 may recommend a closest match based on the object name and object type. For example, if an object searched is 'First Name' and the object repository has no such object, the testing system 302 may find all fields with matching the object type and in that find the closest match for the name of the object based on pattern matching algorithms and return the closest match. In one embodiment, this match may be presented to a user and, if this match is chosen by the user, the testing system 302 may clone object and add the object to the object repository (OAD) with this new name.

Figure 4:
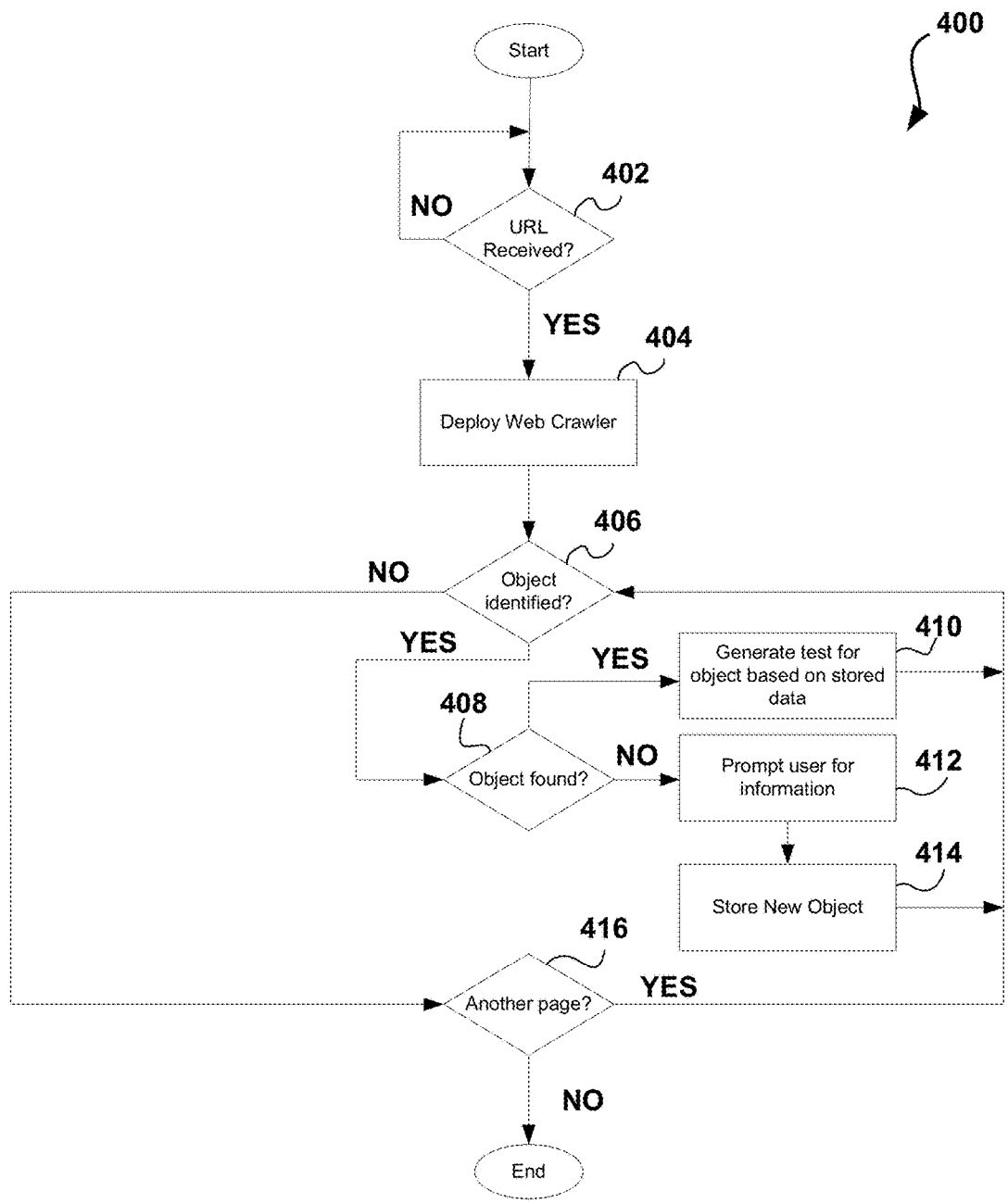
FIG. 4 shows a method for automatically testing software applications including dynamic web pages, in accordance with one embodiment.

FIG. 4 shows a method 400 for automatically testing software applications including dynamic web pages, in accordance with one embodiment. As an option, the method 400 may be implemented in the context of the details of the previous figures and/or any subsequent figure(s). Of course, however, the method 400 may be implemented in the context of any desired environment. Further, the aforementioned definitions may equally apply to the description below.

As shown, an automated testing system determines whether a URL associated with a GUI/webpage to perform automated testing is received. See decision 402. The URL may be received via a user interface associated with the testing system.

If a URL is received, the testing system deploys a web crawler based on the URL to crawl the GUI/webpage to identify input objects used by the GUI/webpage. See operation 404. Further, the testing system determines whether an object to be tested is identified. See operation 406.

When an object is identified, the testing system determines whether a match for the object is found in an object repository (or a closely matching object is found, based on name, type, etc.). See determination 408. If the object is found in the repository, a test is generated for the object based on data stored in the object repository corresponding to the existing object. See operation 410. Furthermore, such test may be executed and the testing system may search for more objects to test.

If an object is not found, the testing system may prompt a user for additional information associated with the object (e.g. parameter information, etc.). See operation 412. Further, the new object and additional information is stored in the object repository. See operation 414. In one embodiment, the user may not be prompted for information and the testing system may fill in the required information based on existing similar object information from the object repository.

As shown further in FIG. 4, once all of the objects have been identified (and tested) on a particular page, the testing system will determine whether there is another page associated with the GUI/webpage to be searched for objects to be tested. See decision 416.

Figure 5:
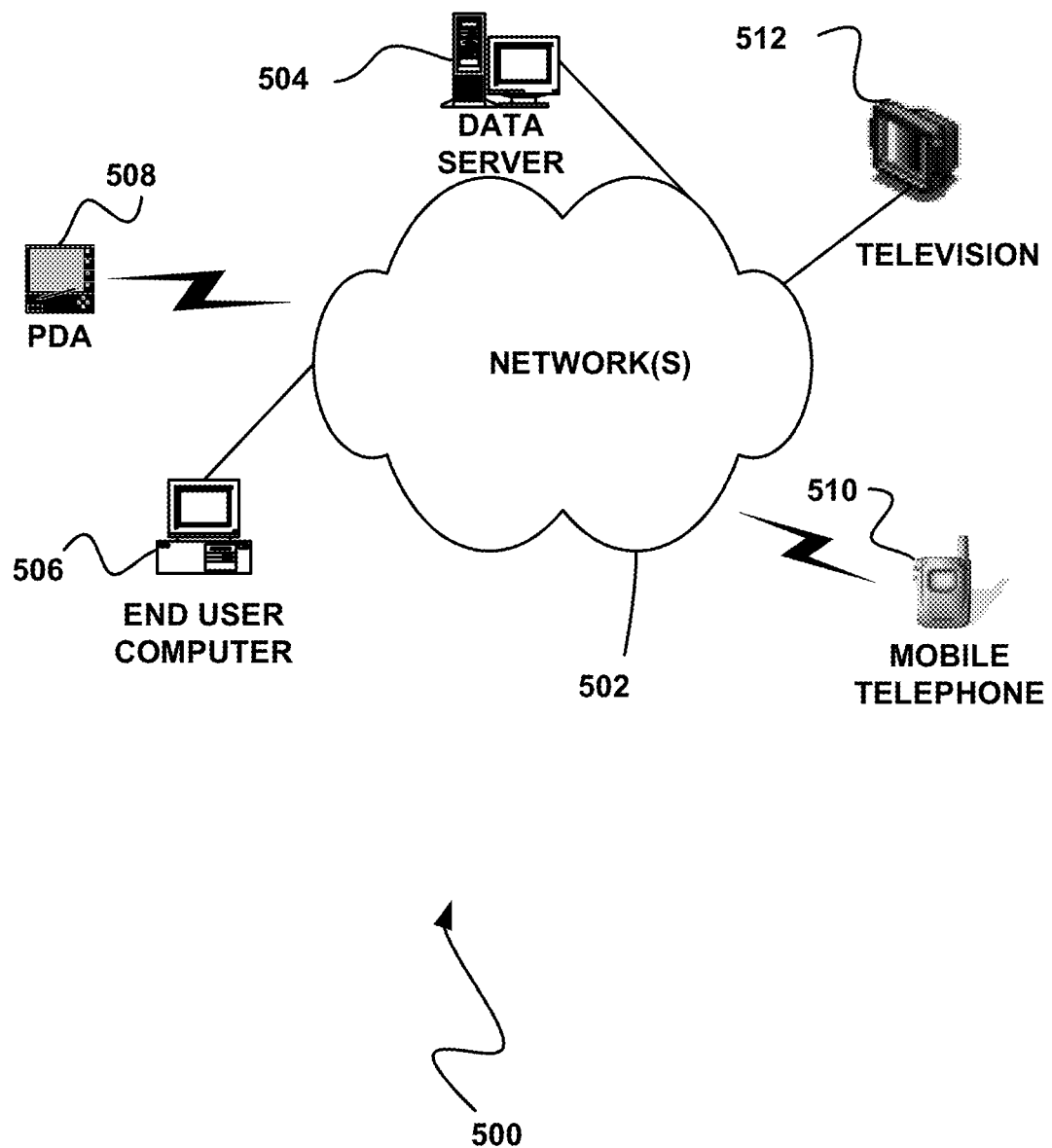
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
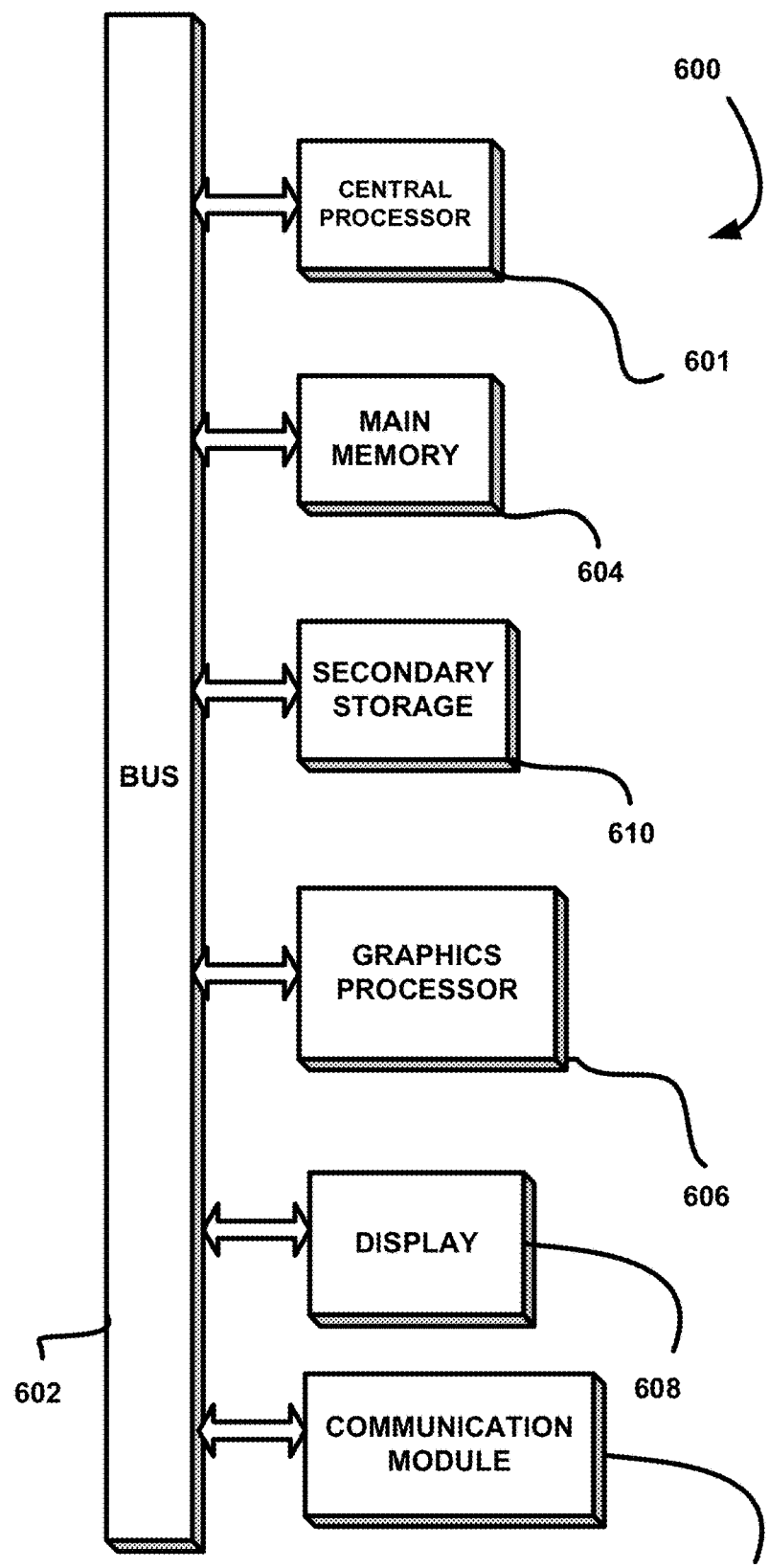
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
    receiving, by an automated testing system, a request to initiate testing of a dynamic web-based software application on which to perform automated testing;
    responsive to receiving the request, utilizing, by the automated testing system, a web crawler to identify a graphical user interface (GUI) that is a dynamic web page of the dynamic web-based software application having a plurality of GUI objects;
    identifying, by the automated testing system, an input object from the plurality of GUI objects, the input object for receiving input;
    determining, by the automated testing system, that the input object is present in an object repository including known input objects and corresponding testing data, by:
        accessing the object repository,
        determining a name of the input object, and
        searching the object repository for a known input object having the name of the input object;
    responsive to determining that the input object is present in the object repository:
        determining, by the automated testing system from the object repository, the testing data corresponding to the known input object having the name of the input object, the testing data including a plurality of data sets each including values capable of being used to test the input object,
        presenting, by the automated testing system to a user, the plurality of data sets capable of being used to test the input object,
        receiving, by the automated testing system from the user, a selection of a particular data set of the plurality of data sets and at least one new value to add to the data set,
        automatically generating, by the automated testing system, a first test for the input object, using the selected data set;
    identifying, by the automated testing system, an additional input object from the plurality of GUI objects, the additional input object for receiving additional input;
    determining, by the automated testing system, that the additional input object is not present in the object repository by:
        accessing the object repository,
        determining a name of the additional input object, and
        searching the object repository for a known input object having the name of the additional input object;
    responsive to determining that the additional input object is not present in the object repository:
    determining an object type of the additional input object,
    searching the object repository for one or more second known input objects having an object type matching the object type of the additional input object,
    selecting one of the one or more second known input objects based on a closest match of a name of the one of the one or more second known input objects with the name of the additional input object,
    recommending the selected second known input object to a user,
    receiving a selection of the second known input object from the user,
    cloning the selected second known input object to generate a new instance of the second known input object, and
    adding the new instance of the second known input object to the object repository with the name of the additional input object,
    automatically generating, by the automated testing system, a second test for the additional input object based on the new instance of the second known input object;
    automatically executing, by the automated testing system, the first test to test the input object and the second test to test the additional input object.

2. The computer program product of claim 1, wherein the input object includes at least one text input field.

3. The computer program product of claim 1, wherein the input object includes at least one drop down menu.

4. The computer program product of claim 1, wherein the request includes a URL (Uniform Resource Locator) associated with the dynamic web-based software application.

5. The computer program product of claim 4, wherein the URL is received as input from a testing user interface.

6. The computer program product of claim 1, wherein web crawler is associated with the automated testing system.

7. The computer program product of claim 1, wherein the input object is a common object with standard behavior between two or more graphical user interfaces.

8. The computer program product of claim 1, wherein the input object is associated with a name input field.

9. The computer program product of claim 1, wherein the input object is associated with an address input field.

10. The computer program product of claim 1, wherein the input object is associated with a billing information input field.

11. A method, comprising:
receiving, by an automated testing system, a request to initiate testing of a dynamic web-based software application on which to perform automated testing;
responsive to receiving the request, utilizing, by the automated testing system, a web crawler to identify a graphical user interface (GUI) that is a dynamic web page of the dynamic web-based software application having a plurality of GUI objects;
identifying, by the automated testing system, an input object from the plurality of GUI objects, the input object for receiving input;
determining, by the automated testing system, that the input object is present in an object repository including known input objects and corresponding testing data, by:
    accessing the object repository,
    determining a name of the input object, and
    searching the object repository for a known input object having the name of the input object;
responsive to determining that the input object is present in the object repository:
    determining, by the automated testing system from the object repository, the testing data corresponding to the known input object having the name of the input object, the testing data including a plurality of data sets each including values capable of being used to test the input object,
    presenting, by the automated testing system to a user, the plurality of data sets capable of being used to test the input object,
    receiving, by the automated testing system from the user, a selection of a particular data set of the plurality of data sets and at least one new value to add to the data set,
    automatically generating, by the automated testing system, a first test for the input object, using the selected data set;
identifying, by the automated testing system, an additional input object from the plurality of GUI objects, the additional input object for receiving additional input;
determining, by the automated testing system, that the additional input object is not present in the object repository by:
    accessing the object repository,
    determining a name of the additional input object, and
    searching the object repository for a known input object having the name of the additional input object;
responsive to determining that the additional input object is not present in the object repository:
determining an object type of the additional input object,
searching the object repository for one or more second known input objects having an object type matching the object type of the additional input object,
selecting one of the one or more second known input objects based on a closest match of a name of the one of the one or more second known input objects with the name of the additional input object,
recommending the selected second known input object to a user,
receiving a selection of the second known input object from the user,
cloning the selected second known input object to generate a new instance of the second known input object, and
adding the new instance of the second known input object to the object repository with the name of the additional input object,
automatically generating, by the automated testing system, a second test for the additional input object based on the new instance of the second known input object;
automatically executing, by the automated testing system, the first test to test the input object and the second test to test the additional input object.

12. An automated testing system, comprising one or more processors operable for:
receiving, by the automated testing system, at least one software application on which to perform automated testing;
responsive to receiving the request, utilizing, by the automated testing system, a web crawler to identify a graphical user interface (GUI) that is a dynamic web page of the dynamic web-based software application having a plurality of GUI objects;
identifying, by the automated testing system, an input object from the plurality of GUI objects, the input object for receiving input;
determining, by the automated testing system, that the input object is present in an object repository including known input objects and corresponding testing data, by:
    accessing the object repository,
    determining a name of the input object, and
    searching the object repository for a known input object having the name of the input object;
responsive to determining that the input object is present in the object repository:
    determining, by the automated testing system from the object repository, the testing data corresponding to the known input object having the name of the input object, the testing data including a plurality of data sets each including values capable of being used to test the input object,
    presenting, by the automated testing system to a user, the plurality of data sets capable of being used to test the input object,
    receiving, by the automated testing system from the user, a selection of a particular data set of the plurality of data sets and at least one new value to add to the data set,
    automatically generating, by the automated testing system, a first test for the input object, using the selected data set;
identifying, by the automated testing system, an additional input object from the plurality of GUI objects, the additional input object for receiving additional input;
determining, by the automated testing system, that the additional input object is not present in the object repository by:
    accessing the object repository,
    determining a name of the additional input object, and
    searching the object repository for a known input object having the name of the additional input object;
responsive to determining that the additional input object is not present in the object repository:
determining an object type of the additional input object,
searching the object repository for one or more second known input objects having an object type matching the object type of the additional input object,
selecting one of the one or more second known input objects based on a closest match of a name of the one of the one or more second known input objects with the name of the additional input object, recommending the selected second known input object to a user, receiving a selection of the second known input object from the user, cloning the selected second known input object to generate a new instance of the second known input object, and adding the new instance of the second known input object to the object repository with the name of the additional input object, automatically generating, by the automated testing system, a second test for the additional input object based on the new instance of the second known input object;

automatically executing, by the automated testing system, the first test to test the input object and the second test to test the additional input object.

\* \* \* \* \*